US009153822B2

(12) United States Patent
Shirvanian

(10) Patent No.: US 9,153,822 B2
(45) Date of Patent: Oct. 6, 2015

(54) NANO-STRUCTURED THIN FILM CATALYST

(75) Inventor: Alireza Pezhman Shirvanian, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 559 days.

(21) Appl. No.: 13/585,108

(22) Filed: Aug. 14, 2012

(65) Prior Publication Data

US 2015/0132683 A1   May 14, 2015

(51) Int. Cl.
*H01M 4/86*   (2006.01)
*H01M 4/92*   (2006.01)
*H01M 4/90*   (2006.01)

(52) U.S. Cl.
CPC .......... *H01M 4/8657* (2013.01); *H01M 4/9016* (2013.01); *H01M 4/9041* (2013.01); *H01M 4/921* (2013.01); *Y02E 60/50* (2013.01)

(58) Field of Classification Search
CPC ...... Y02E 60/50; H01M 8/1004; H01M 4/92; H01M 4/926; H01M 4/8657; H01M 4/8807
See application file for complete search history.

(56) References Cited

U.S. PATENT DOCUMENTS

| | | |
|---|---|---|
| 4,812,352 A | 3/1989 | Debe |
| 5,039,561 A | 8/1991 | Debe |
| 5,338,430 A | 8/1994 | Parsonage |
| 5,466,651 A | 11/1995 | Pfefferle |
| 6,040,077 A | 3/2000 | Debe et al. |
| 6,052,271 A | 4/2000 | Nakamura |
| 6,229,168 B1 | 5/2001 | Nakamura |
| 6,232,629 B1 | 5/2001 | Nakamura |
| 6,278,146 B1 | 8/2001 | Nakamura |
| 6,437,966 B1 | 8/2002 | Nakamura |
| 6,495,872 B2 | 12/2002 | Nakamura |
| 6,576,363 B1 | 6/2003 | Hitomi |
| 6,794,243 B2 | 9/2004 | Nakamura |

(Continued)

FOREIGN PATENT DOCUMENTS

| | | |
|---|---|---|
| EP | 1748509 A1 | 1/2007 |
| WO | 2009029539 A1 | 3/2009 |
| WO | 2009082666 A1 | 7/2009 |

OTHER PUBLICATIONS

Office Action dated Nov. 25, 2013 for U.S. Appl. No. 13/238,300, filed Sep. 21, 2011, pp. 1-10.

(Continued)

*Primary Examiner* — Stewart Fraser
(74) *Attorney, Agent, or Firm* — Damian Porcari; Brooks Kushman P.C.

(57) ABSTRACT

In one embodiment, a catalyst assembly includes a substrate including a base and a number of rods extending from the base; a catalyst layer including a catalyst material; and a first intermediate layer including a first coating material disposed between the substrate and the catalyst layer, the first coating material having a higher surface energy than the catalyst material. In certain instances, the number of rods may have an average aspect ratio in length to width of greater than 1. The catalyst assembly may further include a second intermediate layer disposed between the catalyst layer and the first intermediate layer, the second intermediate layer including a second coating material having a higher surface energy than the catalyst material. In certain instances, the first coating material has a higher surface energy than the second coating material.

20 Claims, 4 Drawing Sheets

(56) References Cited

U.S. PATENT DOCUMENTS

| | | | |
|---|---|---|---|
| 7,015,495 B2 | 3/2006 | Murata | |
| 7,075,773 B2 | 7/2006 | Nakamura | |
| 7,351,444 B2* | 4/2008 | Wang et al. | 427/115 |
| 7,411,300 B2 | 8/2008 | Hu | |
| 7,416,809 B2 | 8/2008 | Narayanan et al. | |
| 7,691,780 B2 | 4/2010 | Adzic et al. | |
| 7,704,918 B2 | 4/2010 | Adzic et al. | |
| 7,704,919 B2 | 4/2010 | Adzic et al. | |
| 7,825,407 B2 | 11/2010 | Fujii et al. | |
| 7,855,021 B2 | 12/2010 | Adzic et al. | |
| 7,935,655 B2 | 5/2011 | Tolmachev | |
| 7,972,569 B2 | 7/2011 | Elam et al. | |
| 8,404,613 B2 | 3/2013 | Adzic et al. | |
| 2001/0001208 A1 | 5/2001 | Nakamura | |
| 2001/0002708 A1 | 6/2001 | Nakamura | |
| 2002/0090738 A1 | 7/2002 | Cozzette et al. | |
| 2004/0018416 A1* | 1/2004 | Choi et al. | 429/44 |
| 2006/0007635 A1 | 1/2006 | Nakamura | |
| 2008/0020923 A1* | 1/2008 | Debe et al. | 502/100 |
| 2009/0075157 A1* | 3/2009 | Pak et al. | 429/44 |
| 2009/0247400 A1 | 10/2009 | Stamenkovic et al. | |
| 2010/0099012 A1 | 4/2010 | Adzic | |
| 2010/0105548 A1 | 4/2010 | Zhang et al. | |
| 2010/0197490 A1 | 8/2010 | Adzic et al. | |
| 2010/0216632 A1 | 8/2010 | Adzic et al. | |
| 2011/0005921 A1 | 1/2011 | Brault | |
| 2011/0143263 A1* | 6/2011 | Shirvanian | 429/523 |
| 2011/0165496 A1* | 7/2011 | Shirvanian | 429/483 |
| 2011/0262828 A1 | 10/2011 | Noda et al. | |
| 2011/0274989 A1 | 11/2011 | Lu et al. | |
| 2012/0196741 A1* | 8/2012 | Shirvanian | 502/159 |
| 2012/0202682 A1* | 8/2012 | Shirvanian | 502/300 |
| 2012/0202683 A1* | 8/2012 | Shirvanian | 502/339 |
| 2012/0251926 A1* | 10/2012 | Shirvanian | 429/530 |
| 2013/0085061 A1 | 4/2013 | Stamenkovic et al. | |
| 2013/0177838 A1 | 7/2013 | Wang et al. | |

OTHER PUBLICATIONS

Ex Parte Quayle Action dated Mar. 25, 2014 for U.S. Appl. No. 13/238,800, filed Sep. 21, 2011, pp. 1-6.

Debe, Mark K., et al, High Voltage Stability of Naonstructured Thin Film Catalysts for PEM Fuel Cells, Journal of Power Source, 161, 2006, pp. 1002-1011.

Gancs, Lajos, et al., Crystallographic Characeristics of Nanostructured Thin-Film Fuel Cell Electrocatalysts: A HRTEM Study, Chem. Mater, 20, 2008, pp. 2444-2454.

Stamenkovic, V. R., et al., Improved Oxygen Reduction Activity on Pt3nl(111) Via Increased Surface Site Availability, Science, vol. 315, Jan. 26, 2007, pp. 493-497.

Jacob, Timo, et al., Chemisorption of Atomic Oxygen on Pt(111) from DFT Studies of Pt-Clusters, Journal of Physical Chem B, 107, 2003, pp. 9465-9476.

Bardi, U., et al., Study of the Growth Mechanism of Platinum Layers on the Na0.7WO3(100) Single Crystal Surface, Surface Science, 162, 1985, pp. 337-341.

Stamenkovic, V., et al. Surface Segregation Effects in Electrocatalysis: Kinetics of Oxygen Reduction Reaction on Polycrystalline Pt3Ni Alloy Surfaces, Journal of Electroanalytical Chemistry, 2003, (554-555), pp. 191-199.

Stamenkovic, V., et al., Surface Composition Effects in Electrocatalysis: Kinetics of Oxygen Reduction on Well-Defined Pt3Ni and Pt3Co Alloy Surfaces, The Journal of Physical Chemistry B, 2002, 106, pp. 11970-11979.

Hammer, B., et al., Electronic Factors Determining the Reactivity of Metal Surfaces, Surface Science 343, 1995, pp. 211-220.

Kelly, Thomas G., et al., Metal Overlayer on Metal Carbide Substrate: Unique Bimetallic Properties for Catalysis and Electrocatalysis, Chem Soc. Rev., DOI: 10.1039/C2CS35165, Apr. 30, 2012, pp. 1-14.

Ham, Dong Jin, et al., Transition Metal Carbides and Nitrides as Electrode Materials for Low Temperature Fuel Cells, Energies, ISSN 1996-1073, 2009, 2, pp. 873-899.

Elezovic, N.R., et al., Synthesis and Characterization of MoOx—Pt/C and TiOx—P/C nano-catalystes for Oxygen Reduction, Abstract Only.

Huang, Sheng-Yang, et al., Electrocatalystic Activity and Stability of Niobium-doped Titanium Oxide Supported Platinum Catalyst for Polymer Electrolyte Membrane Fuel Cells, Science Direct, Applied Catalysis B: Environmental:, Abstract Only.

Koh, Shirlaine, et al., The Journal of Physical Chemistry C, Structure-Activity-Stability Relationships of Pt—Co Alloy Electrocatalysts in Gas-Diffusion Electrode Layers, 2007, 111 (9), Abstract Only.

Paulus U.A., et al., Oxygen Reduction on High Surface Area Pt-based Alloy Catalysts in Comparison to Well Defined Smooth Bulk Alloy Electrodes, Electrochimica Acta 47, 2002, pp. 3787-3798.

Rettew, Robert E., et al., Layer-by-Layer Pt Growth on Polycrystalline Au: Surface-Limited Redox Replacement of Overpotentially Deposited Ni Monolayers, Journal of the Electrochemical Soc., 156, 11, 2009, pp. D513-D516.

* cited by examiner

NANO-STRUCTURED THIN FILM CATALYST

TECHNICAL FIELD

The present invention relates to a nano-structured thin film catalyst.

BACKGROUND

While reliability and working lifetime have been considered for utilizing fuel cell (FC) technologies in automotive applications, catalyst activity remains one factor that needs thorough consideration for commercializing fuel cell technologies and in particular fuel cell vehicles. Efforts have been made with a focus on developing fuel cell catalysts having a desirable electro-catalytic oxygen reduction reaction (ORR). To this end, fuel cell catalysts show some improvement over pure platinum nano-particles and/or pure platinum alloys nano-particles supported on carbon. However, these conventional catalysts, by virtue of being nano-particles, are still prone to agglomeration, dissolution and other durability issues. Development of a durable and active catalyst for proton exchange membrane fuel cell (PEMFC) applications remains a challenge.

SUMMARY

In one embodiment, a catalyst assembly includes a substrate including a base and a number of rods extending from the base; a catalyst layer including a catalyst material; and a first intermediate layer including a first coating material disposed between the substrate and the catalyst layer, the first coating material having a higher surface energy than the catalyst material. The number of rods may have an average aspect ratio in length to width of greater than 1.

In another embodiment, the catalyst assembly further includes a second intermediate layer disposed between the catalyst layer and the first intermediate layer, the second intermediate layer including a second coating material having a higher surface energy than the catalyst material. In certain instances, the first coating material has a higher surface energy than the second coating material.

The catalyst layer may include in a thickness dimension a number of atomic layer of the catalyst material, the number of atomic layers including a first atomic layer of the catalyst material, a second atomic layer of the catalyst material, and a number of intermediate atomic layers of the catalyst material disposed between the first and second atomic layers, a total number of the atomic layers being of 2 to 50 atomic layers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Fuel cells have been pursued as a source of power for transportation because of their high energy efficiency and their potential for fuel flexibility. However, broad commercialization of the fuel cells has been met with many limitations, particularly in relation to the relatively high cost of the fuel cell catalyst. Some of catalyst metals as used in fuel cell applications include noble and transition metals, such as platinum, which are very expensive. One source of the high cost of conventional fuel cell catalyst may be due to the insufficient utilization of the catalyst itself. By way of example, conventional fuel cells employ catalyst such as Pt in the form of nano-particles supported on carbon support. The nano-particles are intrinsically less active than their bulk counterparts. Conventional platinum nano-particles are formed of several hundred or more atoms and several atomic layers of Pt metals; however, only a few surface atomic layers of the nano-particles are accessible to fuel cell reactants and remain active for electrochemical reaction, while majority of the catalyst layers particles at the center of the nano-particle remain essentially inactive. In addition, due to their inherently high surface energy, nano-particles tend to aggregate to form larger particles, and may actually dissolve into the electrolyte membrane and consequently lose surface area and catalytic activities.

One or more embodiments of the present invention, as will be described in more detail below, alleviate some of the above-identified issues associated with the conventional fuel cell catalysts.

Figure 1:
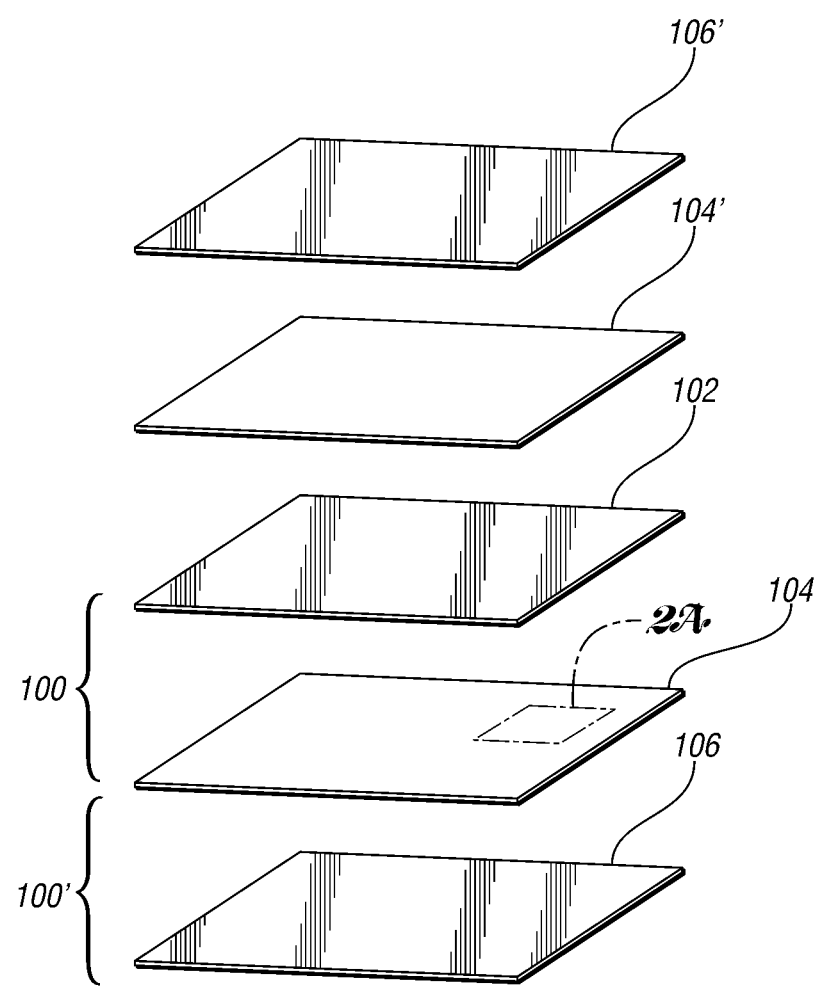
FIG. 1 illustratively depicts an electrode assembly including a catalytic layer according to one more embodiments.

According to one aspect of the present invention, an electrode assembly is provided. In one embodiment, and as depicted in FIG. 1, the electrode assembly can be configured for use as a catalyst coated membrane 100 including a proton exchange membrane 102 and a catalytic layer 104. Alternatively, the electrode assembly can be used as a gas diffusion electrode 100' including a gas diffusion layer 106 and the catalytic layer 104. It is noted that the electrode assembly 100, 100' is equally applicable to the other side of the proton exchange membrane 102, for instance to include a catalytic layer 104' and a gas diffusion layer 106' for use as the other electrode. Average thickness of the catalytic layer 104 may vary from 0.1 microns to 30 microns. With the features specified herein elsewhere, the catalyst layer 104, 104' may be alternatively termed "nano-structured thin film catalyst".

Figure 2A:
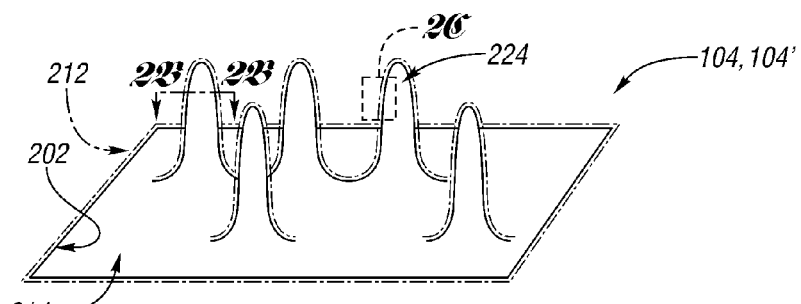
FIG. 2A illustratively depicts an enlarged partial view a substrate included in the catalytic layer of FIG. 1.

FIG. 2A depicts an enlarged sectional view of the catalytic layer 104, 104' of FIG. 1. As depicted in FIG. 2A, the catalytic layer 104, 104' includes a substrate 202 and a coating system generally shown at 212 in contact with at least a portion of the substrate 202. The substrate includes a substrate base 214 and a number of elongated rods 224 extending from the base 214, the number of elongated rods having an average aspect ratio in length to width of greater than 1. In certain instances, the elongated rods 224 may also form on the opposite side of the base 214 such that additional surface area may be provided as needed.

Figure 2B:
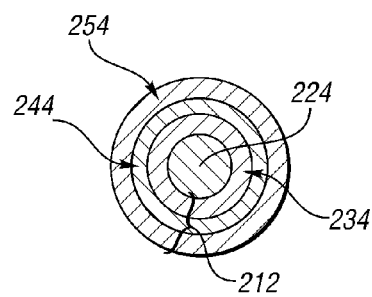
FIG. 2B illustratively depicts an enlarged cross-sectional view of the catalytic layer of FIG. 2A.

As further depicted in FIG. 2B, the coating system 212 includes a catalyst layer 254 including a catalyst material and a first intermediate layer 234 of a first coating material disposed between the elongated rods 224 of the substrate 202 and the catalyst layer 254, the first coating material having a higher surface energy than the catalyst material. The surface energy may be a property to the material with a given chemical composition and may also vary according to the 3D structure of the material. To have a fair comparison, materials in similar geometries are compared. In general, curvature is reciprocal of the radius of curvature and surface energy increases with radius of curvature. By way of example, bulk platinum has a lower surface energy than platinum nanoparticles and bulk tungsten has a higher surface energy than bulk platinum.

In certain instances, and as depicted in FIG. 2B, the coating system 212 may further include a second intermediate layer 244 of a second coating material disposed between the substrate 202 and the layer 234 of first coating material, the second coating material having a higher surface energy than the catalyst material. In certain instances, the first coating material has a higher surface energy than the second coating material. The layer 254 of catalyst material may contact at least a portion of the layer 234 of the first coating material, at least a portion of the layer 244 of the second coating material, and/or at least a portion of the substrate 202 such as a portion of the elongated rods 224. The layer 234 of the first coating material may contact at least a portion of the layer 244 of the second coating material and/or at least a portion of the substrate 202. The layer 244 may contact at least a portion of the substrate 202.

Pt may have a surface free energy of about 2550 $mJ/cm^2$. The first and/or second intermediate coating materials may include materials with surface energy greater than that of Pt. Non-limiting examples of the intermediate coating materials include Vanadium (2600 $mJ/cm^2$), Niobium (2700 $mJ/cm^2$), Molybdenum (2950 $mJ/cm^2$), Ruthenium (3050 $mJ/cm^2$), Rhodium (2750 $mJ/cm^2$), Tantalum (3050 $mJ/cm^2$), Tungsten (3300 $mJ/cm^2$), Rhenium (3650 $mJ/cm^2$), Osmium (3500 $mJ/cm^2$), Iridium (3100 $mJ/cm^2$), oxides thereof, nitrides thereof, and combinations and alloys thereof. Particular examples of the intermediate coating material may include W, Mo, Os, Ir, Nb, Nb oxide, W oxide, and $Na_xWO_3$. To further improve cost efficiency, while accommodating the employment of an intermediate coating layer to stage the layer-to-layer catalyst formation, another intermediate coating may be applied between the substrate and this target intermediate coating layer with relatively cheaper materials and relatively higher surface energy. A particular example can be: a first intermediate coating including W and contacting the substrate, to the first intermediate coating is applied a second intermediate coating of Ir, upon which the catalyst layer of Pt is applied. In this connection, W in the first layer favors the layer-to-layer formation of Ir in the second intermediate coating layer, in turn, the Ir favors the layer-to-layer formation of the Pt atoms in the catalyst layer. In this non-limiting example, a relatively cheaper material W is used to prepare the surface of the substrate 202 to form a layer of W. This is practical. While W has a relatively higher surface energy than the substrate material such as organic material of PR149, a layer of W can be deposited on PR149 to prepare for the secondary coating optionally including Ir. Once this initial layer of W is positioned, a layer of Ir can be positioned upon the layer of W to further smooth the surface as W has a relatively higher surface energy than Ir. Using such a combination of W and Ir is advantageous because W is cheaper than Ir. Such a combined use of W and Ir provides comparably good end result in positioning the final deposition of Pt atomic layers while being relatively more cost effective.

Figure 2C:
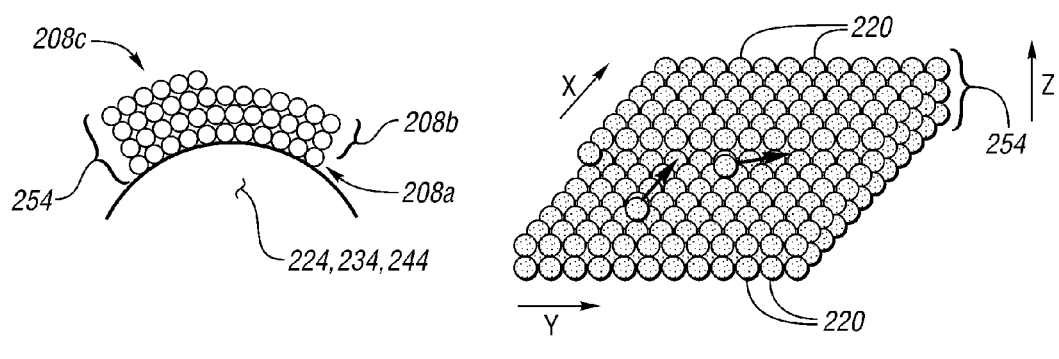
FIG. 2C illustratively depicts an enlarged cross-sectional view of the catalyst layer of FIG. 2B.

The catalyst layer 254 of catalyst material may be extensive in two-dimensions (2-D) relative to its thickness dimension. As depicted in FIG. 2C, the catalyst layer 254 may include a first atomic layer 208a of catalyst atoms 220, a second exposed atomic layer 208c of the catalyst atoms 220, and a number of intermediate atomic layers of the catalyst atoms 220 generally shown at 208b between the first and second atomic layers 208a and 208c, the total number of the atomic layers 208a to 208c being 2 to 50 atomic layers, 2 to 25 atomic layers, 2 to 10 atomic layers. An average total thickness of the catalyst layer 254 may be of no greater than 50 nm, 40 nm, 30 nm, 20 nm, 10 nm, 5 nm, or 1 nm. At least a portion of the atomic layers 208a to 208c are each in at least one of a (111) crystalline arrangement, a (110) crystalline arrangement and a (001) crystalline arrangement. Within each of the atomic layers 208a to 208c, the catalyst atoms 220 are positioned next to each other in an organized crystalline structure.

A dimension along which the catalyst atoms 220 extend laterally, for instance in the directions of x and y, may be greater than a thickness dimension z. The first and second dimensions such as the x and y dimension can be no less than 25 nanometers, 50 nanometers, 75 nanometers, or 100 nanometers. By way of example, Pt atoms when closely packed are of about 0.27 nm in atom-to-atom distance. Therefore, 10 atomic layers of Pt atoms are of about 2.7 nm. The thickness dimension along the z-axis may be in a range of 2 to 120 atomic layers, 2 to 100 atomic layers, 2 to 80 atomic layers, 2 to 60 atomic layers, 2 to 40 atomic layers, 2 to 20 atomic layers. The 2-D extensive catalyst layer 254 can be presented in a pseudo-bulk configuration such that the catalytic metals 220 behave, relative to conventional nano-particles, more like bulk metals. Without wanting to be limited to any particular theory, it is believed that the 2D extensive catalyst layer 254 can thus be crystallographically oriented such that its catalyst material may be effectively utilized.

In the event that the polycrystalline form of materials are used, the preferred polycrystalline for platinum or platinum containing alloys is characterized as having (111) facets and (100) tops. The performance of the (100), (111) and (110) crystal surface of bulk catalyst metal such as platinum is far superior to conventional platinum nano-particles. Because the catalyst such as platinum can be grown in single crystals and configured as a thin continuum film on the substrate that might have nanowires and/or nanorods, this catalyst behaves more like the bulk metal catalyst with preferred crystalline structure and is provided with relatively higher catalytic activity per a given surface atom relative to the catalyst on surface atom in a conventional nano-particle configuration.

Figure 3:
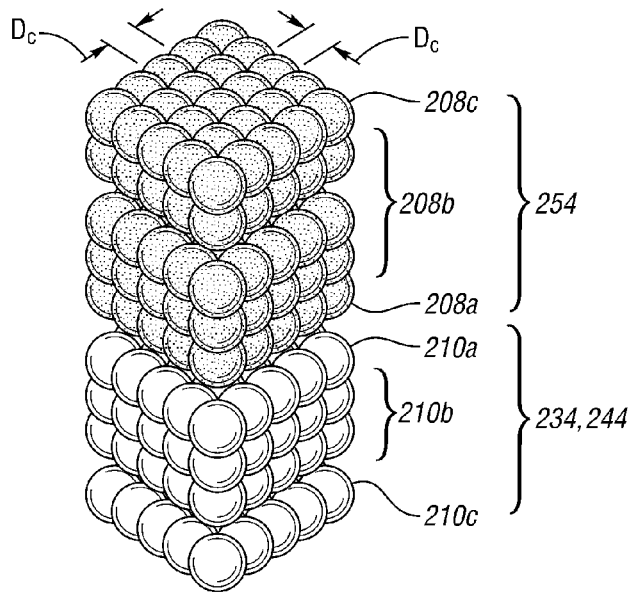
FIG. 3 illustratively depicts an alternative view of the catalyst layer of FIG. 2B.

As depicted in FIG. 3, the catalyst layer 254 includes a catalyst material in one or more atomic monolayers 208a, 208b, 208c supported a coating material in one or more atomic monolayers 210a, 210b, 210c of the first and/or second intermediate layer 234, 244. The coating material has a higher surface energy than the catalyst material. In certain instances, the catalyst material as present in the one or more atomic monolayers 208a, 208b, 208c may have an atomic distance "Dc" smaller than an atomic distance of the catalyst material in bulk. Without wanting to be limited to any particular theory, it is believed that a relatively higher surface energy in the coating material and relatively lateral compression in the catalyst material, alone or in combination, may provide an improvement in electrochemical performance. In certain particular instances, the substrate material includes Ir. Atomic layers of Pt may be arranged on Ir to form the (111) crystalline phase or any other suitable crystalline orientations, including the (110) facet and/or the (100) facet. The term "monolayer" may refer to a single, closely packed layer of atoms or molecules.

In certain instances, the catalyst layer 254 includes two or more atomic monolayers of the catalyst material. In certain particular instances, the layered catalyst 254 includes two to five monolayers of the catalyst material. In certain other instances, the layered catalyst includes two or more atomic monolayers of the substrate material. In certain other particular instances, the layered catalyst includes one to five monolayers of the substrate material.

The atomic distance "Dc" of the catalyst material may refer to a distance between the atomic centers of two adjacent atoms on a particular monolayer such as any one of the monolayers 208a to 208c illustrated in FIG. 3. By way of example, platinum in bulk has a general atomic distance of about 2.77 angstroms; in comparison, atomic distance "Dc" of platinum according to one or more embodiments of the present invention may be reduced to a value smaller than 2.77 angstroms, to effect lateral compression. In certain instances, the atomic distance "Dc" in the example of platinum may have a value of 2.75, 2.72, 2.70, 2.67 or 2.5 angstroms.

Without wanting to be limited to any particular theory, it is believed that the relatively greater surface energy of the coating material induces and facilitates "wetting" of the catalyst material as the latter is being deposited onto the coating material. This wetting is more effective as seen between the immediate contacting layers 208a and 210a. The wetting effect may gradually decrease towards the outer catalyst material outer layers. For instance, it may be seen that the innermost catalyst material monolayer 208a may have relatively more film-mode growth than the outermost monolayer 208c, with the immediate monolayers collectively shown at 208b positioned somewhere in between. At least 70 percent, 80 percent, 90 percent, 95 percent of total atoms of the catalyst material may be in a film-mode growth. In certain other instances, at least 70 percent, 80 percent, 90 percent, or 95 percent of the total surface area of any one of the atomic monolayers 208a to 208c is presented with catalyst atoms formed via film-mode growth. Non-limiting examples of methods for detecting these types of growth may include surface morphology analysis and SEM microscopy.

In one or more embodiments, the term "film-mode growth" refers to atomic arrangement otherwise known as the "Frank-van der Merwe" growth, which is a growth mode of two dimensional layer-by-layer growth in contrast with three dimensional growth with islands otherwise known as the "Volmer-Weber" growth or "Stranski-Krastanov" growth.

The surface free energy of the first and/or second coating material may be 0.1 to 60 percent greater, 1 to 55 percent greater, 5 to 50 percent greater, 5 to 45 percent greater, 5 to 40 percent greater, 5 to 35 percent greater, 5 to 30 percent greater, 5 to 25 percent greater, or 5 to 20 percent greater, than a surface free energy of the catalyst material.

The catalyst material, as present in one or more atomic monolayers 208a, 208b, 208c may have a d-band center in a range of −2.1 eV to −2.25 eV.

Figure 4A:
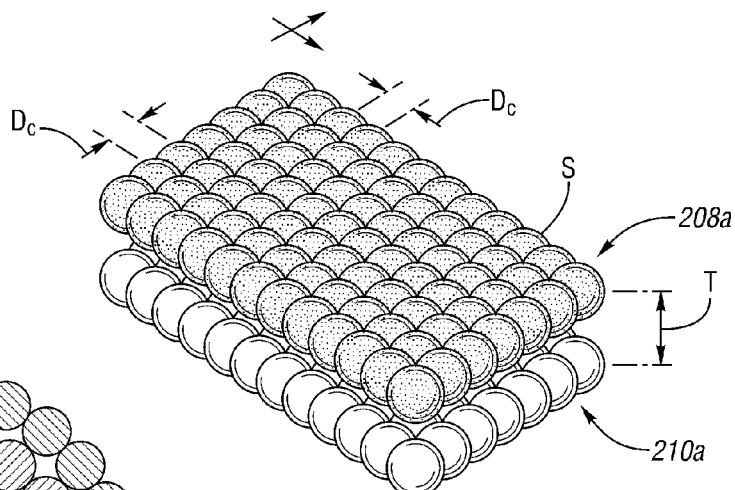
FIGS. 4A and 4B illustratively depict alternative views of the catalyst layer of FIG. 3.

A more expanded perspective view of the catalyst material monolayer 208a and the coating material monolayer 210a is depicted in FIG. 4A, wherein the catalyst layer 254 has a surface axis in the form of an x axis and/or a y axis. In the interest for brevity, only monolayers 208a and 210a are depicted in FIG. 4A. However, it is appreciated that along the thickness "T" direction, the catalyst layer 254 may have any suitable number of the catalyst monolayers and/or any suitable number of the substrate monolayers, such as the monolayers 208b and 208c shown in FIG. 2C. The catalyst layer 254 may have a surface-to-thickness (S/T) aspect ratio of greater than 5 nm. In certain instances, the S/T aspect ratio is greater than 10, 25 nm, 50 nm, 100 nm, 500 nm, or 1,000 nm. In certain instances, the S/T aspect ratio may be of between 5 nm to 130 nm, 10 nm to 120 nm, 25 nm to 110 nm, or 50 nm to 100 nm. In the simplest form, the surface "S" may be determined by the product of the dimension value in x and the dimension value in y. For instance, the catalyst layer 254 may have a S/T value of 90 nm, wherein the x and y are each 30 nm and the catalyst thickness "T" is 10 nm.

Figure 4B:
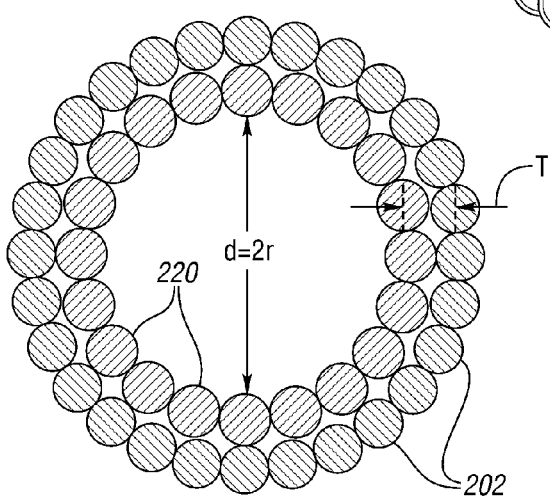

The catalyst layer with thickness "T" contacting a substrate of diameter "d" is illustratively shown in FIG. 4B. Curvature, defined as reciprocal of the radius "r", is chosen to be small enough (or the value of "r" be large enough) so as to avoid offsetting the compression intended in the catalyst layer. In one or more embodiments, an average value of the diameter "d" may be of between 5 nm to 100 µm, 25 nm to 75 µm, 50 nm to 50 µm, 75 nm to 25 µm, 100 nm to 10 µm, 200 nm to 5 µm, or 500 nm to 1 µm. These values present a clear departure from conventional particle dimensions of between 1 to 5 nm, corresponding to tremendous curvature.

In yet another embodiment, the catalyst material includes platinum in an atomic weight percent of no less than 70 percent, 75 percent, 80 percent, 85 percent, 90 percent, or 95 percent. These ratios are for the catalyst material, not for the entire composition including the substrate. The catalyst material may include one or more of the precious metals including platinum (Pt), gold (Au), osmium (Os), iridium (Ir), palladium (Pd), rhenium (Rh), and ruthenium (Ru), and combinations thereof. In certain instances, the catalyst material includes platinum. When Pt is included, the catalyst may be in the form of $PtCu_3$, $PtNi_3$ or $Pt_3Ni$. In the extreme wherein the catalyst material is a layer of pure Pt atoms, the Pt percent should be somewhere near 100%. In certain instances, the catalyst material includes less than 95, 85, 75, 65, 55, 45, 35, 25, 15, or 5 atomic weight percent of transition metals such as Ni, Co, Mo, Cr, W, Zr, Mn, Fe, Rh, Ru, Os, Re, Ta, Nb, V, and/or Ti.

When included, the first and second intermediate layers 234, 244 may have one or more of the following functions: to protect the core material/other coatings in FC environment; to induce better catalytic activity thru lattice mismatch/electronic interactions with catalyst/other pre-coatings; and to promote growth of certain desirable crystalline orientations/nanostructures. Examples for these pre-coatings may include polymers/(conductive or non-conductive), metal oxides (such as $NbO_2$, $Nb_2O_5$, $WO_3$, $Na_xWO_3$, and WC), and/or metals (such as Ir, W, Os, Rh, Ru, Mo, Nb, Ta, V), and combinations thereof.

For instance, niobium oxide and iridium may be employed to interact with catalyst support to produce: a) high surface area support; b) more active catalysts—through electronic structure and lattice mismatch interactions between support and catalyst or through promotion of the growth of favorable crystalline facets of the catalyst due to interaction between catalyst and support—many polymers either conductive or non-conductive could produce such effects; c) using higher surface energy support metal/metal oxide materials, one can generate a more conformal coating of catalyst on the support as opposed to nucleating the catalyst on the support—conformal coating of the catalyst on support leads to a true thin film with minimal and uniform thickness thereby reducing the requisite catalyst loading.

The first and/or second coating material may include one or more of any suitable elements that have a surface free energy value greater than that of the catalyst material. Non-limiting examples of the first and/or second coating material include Mo, Nb, Tc, Rh, Ru, Ir, Ta, W, Re, Os, V, Fe, and combinations and oxides thereof. In certain instances, the second coating material includes Ir and the first coating material includes W.

Surface free energy may be determined via the equation $$\gamma = \frac{dW}{dA},$$

wherein the thermodynamic quantity, Gamma, represents the reversible work needed to generate a unit area of surface at constant temperature, volume and chemical potential. Non-limiting examples of surface free energy values at temperature of 373K include Pt of about 2490 millijoules (mJ)/cm$^2$, Mo of about 2899 mJ/cm$^2$, Nb of about 2648 mJ/cm$^2$, Rh of about 2690 mJ/cm$^2$, Ru of about 2987 mJ/cm$^2$, Ta of about 2998 mJ/cm$^2$, W of about 3244 mJ/cm$^2$, Os of about 3444 mJ/cm$^2$, Ir of about 3040 mJ/cm$^2$, V of about 2540 mJ/cm$^2$, Pd of about 2040 mJ/cm$^2$, Ti of about 2002 mJ/cm$^2$, and Ni of about 2375 mJ/cm$^2$.

The d-band center values and the surface free energy values may be considered independent of each other. Without wanting to be limited to any particular theory, it is believed that with the d-band values suitable catalytic activities regarding a particular set of the catalyst and substrate may be determined; and with comparative surface free energy values preferable thin film growth of the catalyst atoms may be secured over a particular substrate material.

An analysis on the d-band center may be employed to characterize the adsorption properties of different species on d-band metals. Kitchin et al., Physical Review Letters, vol. 93, Nov. 15, 2004 provides a good reference for d-band center analysis, the entire contents thereof are incorporated herein by reference.

By way of example, the d-band center for pure Ir(111) is −1.95 eV, and the d-band center for one Pt layer on Ir is −2.4 eV, a lower value than that for pure Ir(111). The d-band analysis may not necessarily be limited to the material type being used. The d-band values may vary by the number of Pt layers and/or the type of substrate used. The d-band center for two Pt layers on Ir is −2.25 eV, an even lower value. The d-band center for three Pt layers on Ir is −2.24 eV, a value comparable to that of the two Pt layers on Ir. The d-band center for four Pt layers on Ir is −2.17 eV. The d-band center for five Pt layers on Ir is −2.18 eV. The d-band center for Pt layers compressed to Ir lattice is −2.15 eV. For compressing the Pt layers, one could use sputtering, vapor deposition, and/or atomic layer deposition (ALD) to achieve the compression. Ir lattice constant is 2.72 Angstroms while Pt lattice constant is 2.77 Angstroms, both in bulk surfaces. The term "lattice constant" may refer to distance between two adjacent atoms. The d-band center for pure Pt(111) is −2.08 eV.

Unlike conventional Pt/C nano-particles wherein Pt metals are present in discrete particles and electronic connection between the discrete particles is provided through the carbon support material, the catalyst metal atoms as presented in a continuum film according to one or more embodiments of the present invention are substantially connected to each other electronically without the need for an intermediate connecting medium such as carbon. When included, carbon is present in an amount less than 20 percent by weight (wt %), 15 wt %, 10 wt %, 5 wt %, 1 wt %, 0.5 wt %, or 0.05 wt % of the total dry weight of the catalyst layer 254.

In one or more embodiments, the term "platinum group metal" or "platinum group metals" (PGM) refers to a group of six metallic elements clustered together in the periodic table. The group oncludes Ru (ruthenium), Rh (rhodium), Pd (palladium), Os (osminum), Ir (iridium) and Pt (platinum). Os, Ir and Ru can be grouped together as a subgroup called the iridium group metals (IGM). Rh, Pt and Pd can be grouped together as a subgroup called the palladium/platinum group metals (PPGM).

The first coating material of the first coating layer 234 may include a first metal that is less precious than any of the six metallic elements (Ru, Rh, Pd, Os, Ir and Pt) listed in the PGM. The second coating material of the second coating layer 254 may include a second metal that more precious than the first metal and less precious than the catalyst material. In this connection, the catalyst material can include any one of the PPGM, the second coating material can include any one of the IGM, and the first coating material can include any other metals less precious than the PGM.

The term "less precious" or "more precious" may refer to a property of a material as being relatively less or more available as a natural resource, less or more costly in market value. By way of example, W is less precious than Ir or Pt as W is relatively cheaper.

In certain instances, the substrate 202 preferably does not contain any metals in a measurable amount. This is beneficial as metals do not in general anneal at relatively mild elevated temperatures, nor do they assist in the annealing process of an organic material. In this connection, when a metal is accidentally included in the substrate 202, the total content of the metal is less than 5 percent by weight, 2.5 percent by weight, 1 percent by weight, 0.05 percent by weight, or less than 0.01 percent by weight. When included, the first coating material 234 includes a first metal and the second coating material 244 includes a second metal different from the first metal. In certain instances, the second metal is more precious than the first metal. The substrate 202 and particularly the elongated rods 224 of the substrate 202 may be formed of any suitable organic material that is heat anneal-able.

Elongated rods 224 may have any suitable cross-sectional shapes, including the shapes of a round and a polygon such as triangles or rectangles. The elongated rods 224 may have any suitable aspect ratios between an average length dimension and an average cross-sectional dimension. The aspect ratios of average length to cross-sectional dimensions may be no less than 0.1, 1, 10, 50, 100, 150, or 200, and no greater than 10,000, 5,000, 1,000, or 500. The elongated rods 224 may be spaced apart from each other with an average distance in between an adjacent pair of the substrate hairs. The average distance may be no less than 1, 5, 10, 25, 50, 75, 100, or 150 nanometers, and no greater than 15,000, 10,000, or 5,000 nanometers.

The elongated rods 224 may be spaced apart from each other with an average distance of 10 to 500 nanometers, 50 to 500 nanometers, 100 to 400 nanometers, 100 to 300 nanometers, 200 to 500 nanometers, 300 to 500 nanometers, or 400 to 500 nanometers.

The elongated rods 224 may have an average thickness dimension of 10 to 500 nanometers, 10 to 200 nanometers, 10 to 150 nanometers, 10 to 100 nanometers, 10 to 75 nanometers, 10 to 50 nanometers, 25 to 200 nanometers, 50 to 200 nanometers, 75 to 200 nanometers, 100 to 200 nanometers, 125 to 200 nanometers, or 150 to 200 nanometers.

The elongated rods 224 may have an average length dimension of 0.05 to 20 micrometers, 0.5 to 20 micrometers, 0.5 to 15 micrometers, 0.5 to 10 micrometers, 0.5 to 5 micrometers, 1 to 20 micrometers, 2.5 to 20 micrometers, 5 to 20 micrometers, 7.5 to 20 micrometers, 10 to 20 micrometers, 12.5 to 20 micrometers, or 15 to 20 micrometers.

The elongated rods 224 may be referred to as elongated nano-rods. The term "nano-rods" does not necessarily indicate that the wires are of dimensions in nanometer scale. The elongated rods 224 may have an average diameter in nanometer scale and/or an average length in micrometer scale. The elongated rods 224 may refer to any nano-structures of any suitable shape to provide added surface area. The elongated rods 224 may have an average diameter in nanometer scale and/or an average length in micrometer scale.

In forming the catalyst layer 254, catalyst atoms 220 may be deposited onto the substrate 202 via any suitable deposition methods. Non-limiting examples of the deposition methods include atomic layer deposition (ALD), chemical vapor deposition (CVD), physical vapor deposition (PVD), underpotential deposition (UPD), thermal deposition, ion sputtering, ion beam assisted deposition (IBAD), and vacuum deposition such as electron beam physical vapor deposition (EB-PVD) or RF sputtering.

ALD (atomic layer deposition) may be self-limiting in that the amount of film material deposited in each reaction cycle is constant. ALD is similar in chemistry to CVD (chemical vapor deposition), except that the ALD reaction is believed to break the CVD reaction into two half reactions, keeping the precursor materials separate during the reaction. Due to the characteristics of self-limiting and surface reactions, ALD film growth makes atomic scale deposition control possible. By keeping the precursors separate throughout the coating process, atomic layer control of film growth may be obtained as fine as approximately one monolayer of atoms, or approximately 3 Angstroms.

Each reaction cycle adds a given amount of material to the surface, referred to as the growth per cycle. To grow a material layer, reaction cycles are repeated as many as required for the desired film thickness. One cycle may take time from half a second to a few seconds and deposit between 0.1 and 3 angstroms of film thickness. Before starting the ALD process, the surface is stabilized to a known, controlled state, usually by a heat treatment. Due to the self-terminating reactions, ALD is a surface-controlled process, where process parameters other than the precursors, substrate, and temperature may have little or no influence. And, because of the surface control, ALD-grown films can be expected to be greatly conformal and uniform in thickness.

Using ALD, film thickness may only be variable to the number of reaction cycles, which makes the thickness control relatively accurate and simple, with little to no dependence on reactant flux homogeneity. ALD is also adaptable to a wide range of film materials and can be operated under relatively low temperatures.

Because the elongated rods 224 can be formed from a substrate material via thermal annealing, the elongated rods 224 can be provided with controllable dimensions. For instance, an average diameter of the elongated rods 224 can be no less than 10 nm, 20 nm, 30 nm, or 40 nm, and no greater than 250 nm, 200 nm, 150 nm, or 100 nm. Without wanting to be limited to any particular theory, it is believed that these elongated rods 224 may be provided with a surface curvature suitable for accepting the formation and configuration of the catalyst layer 254 with 2-D configuration. It may be desirable to form elongated rods 224 with relatively large diameter in average to minimize the high surface energy. On the other hand, the elongated rods 224 should not have an average diameter that is too large which will result in a loss in effective surface area.

Relative ORR activities can be calculated using computational methods and are a function of calculated d-band center. Computational methods may include density functional theory (DFT). In these calculations, RPBE (GGA) functional is used for calculating exchange correlation. Spin polarization is included. DZ (double zetta) local basis is used for all atoms. Desirable electrochemical features and catalytic activities may be identified via this analysis. Pt/Ir(111) and 4Pt/Ir(111) may have desirable ORR activities based on calculated d-band centers. Comparatively, pure Pt(111), 2Pt/Ir(111) and 3Pt/Ir(111) are of acceptable ORR activities, while the ORR activity for 1Pt/Ir(111) is relatively less.

In one or more embodiments, the catalyst atoms grow on the substrate material as layers of 2-dimensional (x, y) extensive film with a thickness dimension (e.g., z direction) of 1 to 20 atomic layers, 2 to 16 atomic layers, or 3 to 10 atomic layers. Without wanting to be limited to any particular theory, it is believed that the 2-dimensional extensive catalyst film is both structurally and functionally different from conventional catalyst nano-particles or catalyst alloys, wherein catalyst atoms aggregate and form particles by themselves or with other alloy partners to be stable.

In one or more embodiments, the present invention is advantageous in that relatively less loading of catalyst material may be used to elicit comparatively acceptable catalytic activities. In addition, the number of catalyst material layers can be varied to obtain a catalytic activity suitable for a particular application at hand. In this regard, the cost associated with the amount of catalyst loading may be balanced against the amount of catalytic activity one is seeking. As a result, more flexibility is provided to the catalyst design.

In one or more embodiments, the present invention is advantageous in that established methods are readily available to deposit one or more layers of a catalyst material onto a substrate material. In this regard, troublesome annealing process as used in the art may be avoided altogether, although not impermissible as a way of arranging the catalyst and substrate materials in the present invention. $Pt_3Ni$-skin, a known catalyst for instance, must be annealed via complex annealing procedures and parameters to gain catalytic activities directed to the outermost surface layers, which are structurally pure Pt layers but not a combination of Pt and Ni, as exposure of Ni to a corrosive electrochemical environment may be detrimental to the catalyst integrity and activity. In contrast, for Pt/Ir according to one or more embodiments of the present invention, Pt can be readily deposited onto Ir as thin layers to avoid the exposure of Ir atoms, and in the meantime, the deposition of Pt is synergistically facilitated by both the favorable surface free energy differential between the Pt and Ir atoms. The electronic interactions between Pt and Ir, in addition to lattice compression of Pt due to the presence of Ir support layers, makes this interaction catalytically more active towards ORR as demonstrated by the d-band center of the Pt/Ir layered complex. In this regard, Pt cannot be readily deposited as a thin film onto a Ni support as Ni has a lower surface free energy than Pt and therefore, the resultant surface free energy differential is not in favor but is against the thin film growth of the Pt layers.

In one or more embodiments, the present invention is advantageous in that the pairing between the catalyst material and the substrate material can be selected such that the catalyst material, upon deposition, grows to form a thin film, in a two-dimensional layer-by-layer growth manner. This selection may be based on respective surface free energies of the catalyst and substrate materials. For instance, surface free energies for Ir and Pt are respectively 3100 $mj/cm^2$ and 2550 $mj/cm^2$. As a result, Pt is believed to form a two-dimensional extensive thin film upon deposition onto Ir. In this regard, Pt may grow according to the Frank-van der merwe (FV) mode of growth or layer by layer growth. In other words, Ir atoms have higher surface free energies to "pull" the Pt atoms, or conversely, that Pt wets the surface of Ir.

A non-limiting example of the substrate 202 is a nanostructured perylene red (PR149) made by thermal sublimation and vacuum annealing of the organic pigment C.I. Pigment Red 149, i.e., N,N'-di(3,5-xylyl)perylene-3,4:9,10-bis(dicarboximide), with deposition and annealing. These nanostructured PR149 may have large aspect ratios, have lengths of about 0.5 to 2 micrometers and widths of about 0.03-0.05 micrometer. Exemplary disclosures for making the PR149 nanostructured rods can be found in U.S. Patent Application Publication 2008/002093.

The rods 224 may be formed from an organic-based material such as perylene red. Resultant rods may have an areal density of $10^7$ to $10^{11}$ per cm². In this connection, a layer of perylene red may be applied by physical vacuum vapor deposition and annealed in a vacuum, for instance at about 0.1 Pascal, and at a temperature of via annealing at a temperature of 230 to 270 degrees Celsius for 3 to 60 minutes.

Useful organic materials for forming the rods 224 may include organic materials broadly classified as polynuclear aromatic hydrocarbons and heterocyclic aromatic compounds. Non-limiting examples of these organic materials may include naphthalenes, phenanthrenes, perylenes, anthracenes, coronenes, and pyrenes. Pigment Red 149 (PR149) is a particularly useful polynuclear aromatic hydrocarbon with the chemical name of N,N'-di(3,5-xylyl)perylene-3,4,9,10 bis(dicarboximide).

The present invention, in one or more embodiments, provides a catalytic layer with relatively cost efficient base material having nano or micro structures to increase surface area, with intermediate coating layer(s) disposed between the base material and the catalyst material to facilite thermodynamically favorable thin film growth and configuration of the catalyst material. In certain instances, the intermediate coating layer(s) may provide additional catalytic activities. With the employment of the intermediate coating layer(s), selection and design window for the substrate material and the catalyst material can be effectively broadened via the choice of the intermediate coating material. In this connection, relevant materials can be selected also to be chemically resistive to corrosion as exists in the electrochemical environment of the fuel cells.

The present invention, in one or more embodiments, is advantageous in that one or more intermediate coatings can be employed to achieve different functionalities, including promoting layer-by-layer deposition of catalyst, promoting catalytic activity, promoting resistivity to corrosion in electrochemical environment. Pre-coating can function as promoter of layer-by-layer growth of PGM catalyst or promoter of catalytic activity. As stated herein elsewhere, the first intermediate coating may be used to mainly facilitate layer-by-layer growth of the second intermediate coating.

Figure 5A:
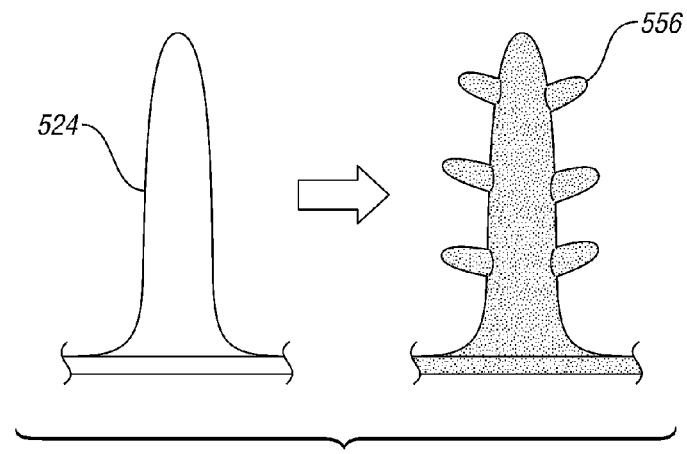
FIGS. 5A and 5B illustratively depict features on the substrate of FIG. 2A, before and after one or more intermediate coatings.
Figure 5B:
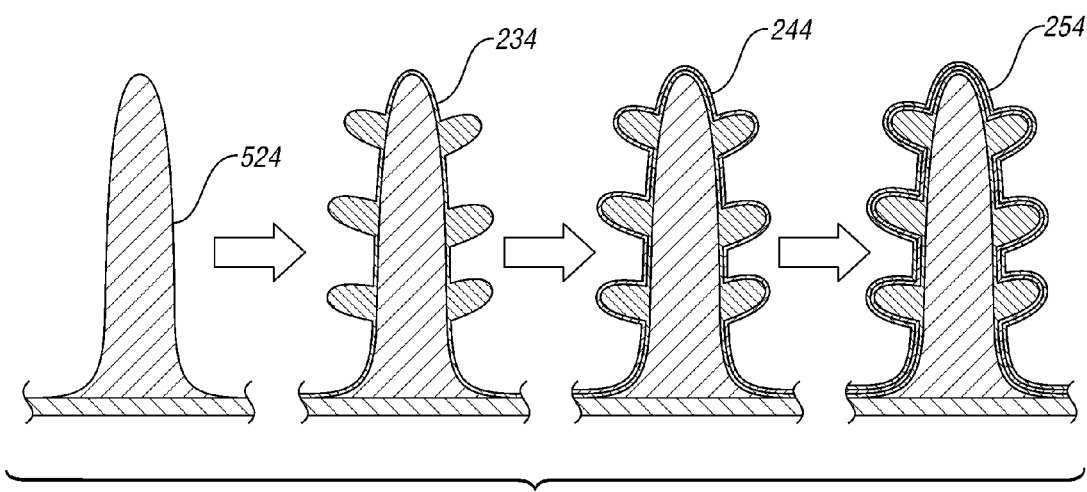

A non-limiting benefit of the present invention can be illustrated in FIG. 5B in view of FIG. 5A. As depicted in FIG. 5A, and in instances that catalyst layer is directly deposited onto and in contact with a support 524 formed of a polymer material such as PR149. Due to the relatively lower surface energy of the PR149 material, nucleation or island formation (3D formation) of catalyst materials on the PR149 support is favored over the layer-to-layer formation (2D formation). For illustration purposes, the layer-to-layer or 2D formation may be referred as the Frank van der Merwe growth, and the island or 3D formation may be referred to as the Volmer-Weber growth. The layer-by-layer growth and the island growth may be differentiated from the AES or XPS intensities as a function of deposition time.

Due to the relatively low surface free energy of the polymer material PR149, catalyst materials such as Pt atoms do not readily grow in layer-by-layer configuration, because the layer-by-layer or two dimensional (2D) (Frank-van der Merwe (FM)) growth is not thermodynamically favorable on these low surface energy materials such as PR149. Rather, they form islands 556 on the support 524. In this connection, the expensive precious catalyst materials must be loaded sufficiently high so as for the resultant catalyst to appear as a continuous layer. In these instances, these islands 556 of the precious metals tend to have an average thickness of 8 to 10 nm or greater, with a general total required Pt loading that is often beyond certain commercial development targets.

In comparison, and according to one or more embodiments of the present invention, one or more intermediate coatings such as the first and second intermediate coatings 234, 244 can be applied to the substrate rods 524 prior to the deposition of the catalyst material. In this connection, and due to the relatively low surface energy of the organic material such as PR149, the first coating material may still grow in the form of islands. However, because the first coating material is chosen to have a higher surface energy than the catalyst material, the catalyst material is much more likely to grown in thin layer-to-layer film of 2 to 50 or even fewer atomic layers. In this connection, the often inevitably formed islands can now formed with a much less expensive material, the much more expensive precious catalytic metals only need to be deposited in a few atomic layers, the formation of which is further enhanced by virtue of the surface energy differential between the coating material and the catalyst material. Another benefit is believed to be that when intermediate material forms a layer on the elongated rods, the intermediate material/layer 234 may settle to its lowest surface energy, and in particular, may be provided with (110), (100) and/or (111) crystalline facets. The catalyst material 254 such as Pt that is later applied may assume one or more of these crystalline surfaces in what is called epitaxial growth.

EXAMPLES

Example 1

Building a Pt/Ir catalyst. Computational calculations are carried out with the use of ADF/BAND (Amsterdam Density Functional) software, which may be available from Scientific Computing & Modeling of the Netherlands. In these calculations, RPBE (GGA) functional is used for calculating exchange correlation. Spin polarization is included. DZ (double zetta) local basis set is used. Innermost atomic shells are frozen. Relativity effects are accounted for using first order perturbation theory. A four-layer thick Ir slab is used, of which the top two layers are relaxed and the bottom two layers are fixed in bulk. For Pt (111) layers, 1 to 5 layers of laterally compressed Pt are on the Ir support, wherein all layers are relaxed. The term "fixed in bulk" may refer to the arrangement wherein atomic distances between layers are frozen to their bulk value. The term "layered relaxed" may refer to the arrangement wherein atomic distances between layers are allowed to vary so the DFT optimizer can find the optimal value between layer distances. The term "four layer thick slab of Ir" may refer to four monolayers of Ir, with some of the monolayers fixed in bulk while top layers are relaxed. This slab is used to represent the bulk Ir substrate.

Example 2

Analyzing the Pt/Ir catalyst from the Example 1. Pt layer distance is about 2.4 angstroms for 1 to 5 layers. All Pt layers are laterally compressed to 2.72 Angstroms while layer distances may vary. Layer distance for the Ir layers is about 2.20 angstroms for 1 to 5 layers, wherein corresponding value for a bulk is about 2.25 angstroms. The Ir layers are not laterally compressed but are kept at their own lattice constant, with the two top layers of Ir being allowed to relax. With one Pt layer, the catalyst of 1Pt/Ir is about 2.25 angstrom, similar to Ir bulk. Four Ir layers are used for cell calculations. With 2 Pt layers and up, the Pt—Pt interlayer is about 2.30 angstrom, wherein lateral Pt compression may be compensated by the increase in Pt layer distances. Corresponding values are tabulated in Table 1.

TABLE 1

| nPt/Ir (111) | 0 | 1 | 2 | 3 | 4 | 5 | Pt@Ir(111) | Pt(111) |
|---|---|---|---|---|---|---|---|---|
| $D_{8-9}$(Å) | | | | | | 2.43 | | |
| $D_{7-8}$(Å) | | | | | 2.4 | 2.42 | | |
| $D_{6-7}$(Å) | | | | 2.38 | 2.33 | 2.36 | | |
| $D_{5-6}$(Å) | | | 2.38 | 2.35 | 2.33 | 2.32 | | |
| $D_{4-5}$(Å) | | 2.41 | 2.26 | 2.27 | 2.23 | 2.24 | | |
| $D_{3-4}$(Å) | 2.25 | 2.21 | 2.17 | 2.21 | 2.16 | 2.19 | 2.45 | 2.36 |
| $D_{2-3}$(Å) | 2.16 | 2.25 | 2.21 | 2.19 | 2.14 | 2.19 | 2.28 | 2.27 |
| $\Delta E_{sep}$(eV/atom) | | 1.25 | 0.78 | 0.83 | 0.66 | 1.04 | | |

The un-filled areas in Table 1 indicate that corresponding information is not applicable and/or no appreciable data is available. The term $\Delta E_{sep}$ (eV/atom) may refer to separation energy, the energy needed to break bonds and separate one monolayer from the top of the substrate. The term "D" may refer to the distance in Angstrom between layers. In this experiment, four monolayers of Ir are used, with the bottom two layers being fixed at bulk distance.

Without wanting to be limited to any particular theory, it is believed that catalytic activities may correlate with interactions between catalytic surfaces and their surrounding reactants or adsorbates such as oxygen. Desirable catalytic activities may correspond to a "give and take" balance between the surface interactions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A catalyst assembly comprising:
   a substrate including a number of rods extending from a base;
   an intermediate layer including an intermediate coating material and contacting the number of rods and including a number of islands; and
   a catalyst layer including a catalyst material and contacting the intermediate layer, the intermediate coating material having a higher surface energy than the catalyst material.

2. The catalyst assembly of claim 1, wherein the catalyst layer contacts at least a portion of the number of rods.

3. The catalyst assembly of claim 1, wherein the intermediate coating material includes Tungsten (W).

4. The catalyst assembly of claim 1, wherein the number of rods have an average aspect ratio in length to width of greater than 1.

5. The catalyst assembly of claim 1, wherein the intermediate layer includes first and second intermediate layers, the intermediate coating material includes first and second intermediate coating materials, the first intermediate layer includes the first intermediate coating material, and the second intermediate layer includes the second intermediate coating material and has a higher surface energy than the catalyst material.

6. The catalyst assembly of claim 5, wherein the first intermediate coating material has a higher surface energy than the second intermediate coating material.

7. The catalyst assembly of claim 5, wherein the second intermediate coating material includes Iridium (Ir).

8. The catalyst assembly of claim 1, wherein the catalyst layer includes a number of atomic layers of the catalyst material extending in a thickness dimension, the number of atomic layers including a first atomic layer of the catalyst material, a second atomic layer of the catalyst material, and a number of intermediate atomic layers of the catalyst material disposed between the first and second atomic layers.

9. The catalyst assembly of claim 8, wherein the number of atomic layers has a total thickness of no greater than 30 nanometers.

10. The catalyst assembly of claim 1, wherein the substrate includes an organic material.

11. The catalyst assembly of claim 1, wherein the substrate is less than 5 percent by weight metal.

12. The catalyst assembly of claim 5, wherein at least one of the first and second intermediate coating materials includes a metal oxide.

13. The catalyst assembly of claim 5, wherein at least one of the first and second intermediate coating materials includes a metal nitride.

14. The catalyst assembly of claim 1, wherein the base and the number of rods are integral to each other.

15. A catalyst assembly comprising:
   a substrate including a number of rods extending from a base;
   a first intermediate layer including a first intermediate coating material and contacting the rods and including a number of islands projecting outward from one of the number of rods; and
   a second intermediate layer including a second intermediate coating material and contacting the first intermediate layer; and
   a catalyst layer including a catalyst material and contacting the second intermediate layer.

16. The catalyst assembly of claim 15, wherein the number of rods have an average aspect ratio in length to width of greater than 1.

17. The catalyst assembly of claim 15, wherein the first intermediate coating material has a higher surface energy than the second intermediate coating material.

18. The catalyst assembly of claim 15, wherein the substrate is less than 5 percent by weight metal.

19. The catalyst assembly of claim 15, wherein the base and the rods are integral to each other.

20. A catalyst assembly comprising:
a substrate including a number of rods extending from a base;
an intermediate layer including an intermediate coating material and contacting the number of rods and including a number of islands; and
a catalyst layer including a catalyst material and contacting the number of islands of the intermediate layer, the first coating material having a higher surface energy than the catalyst material.

* * * * *